April 30, 1968  R. D. WESTERMAN  3,380,163
PRECISION INTRA-ORAL INSTRUMENT
Filed July 2, 1964                2 Sheets-Sheet 1

INVENTOR
ROBERT D. WESTERMAN
BY Cushman, Darby & Cushman
ATTORNEYS

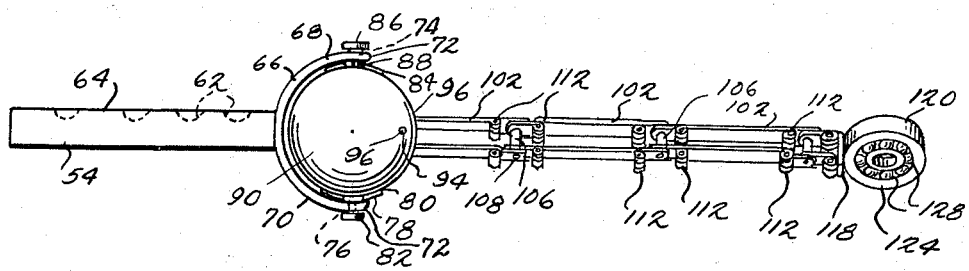
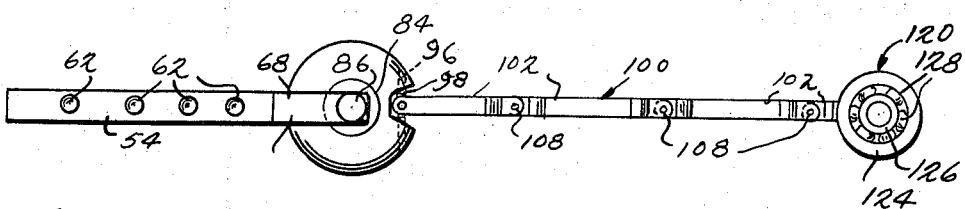
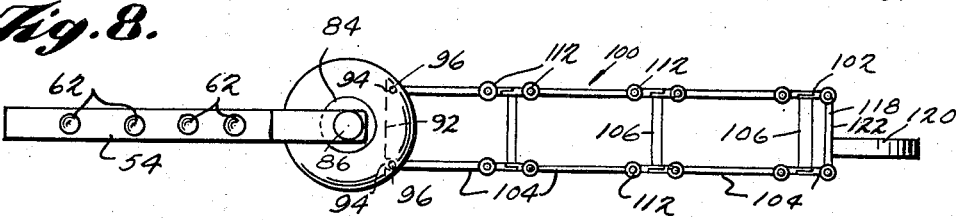
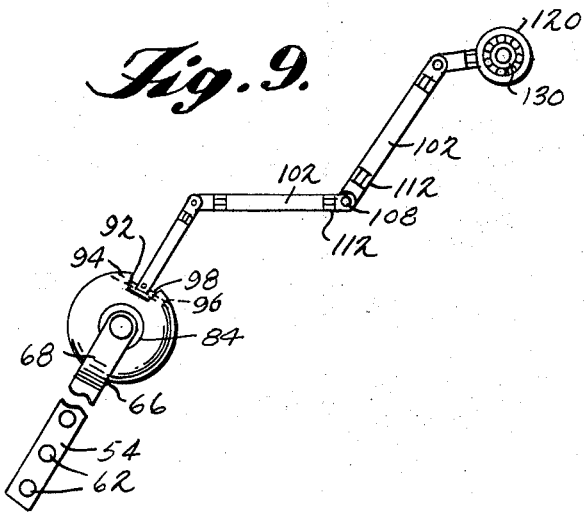
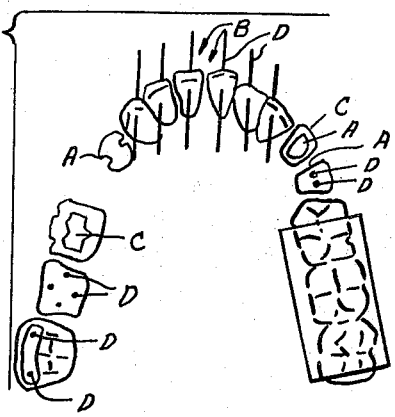

3,380,163
PRECISION INTRA-ORAL INSTRUMENT
Robert D. Westerman, 108 Nebraska Road,
Dyess AFB, Tex. 79607
Filed July 2, 1964, Ser. No. 379,881
12 Claims. (Cl. 32—67)

The present invention relates to apparatus for enabling a dentist to drill parallel holes or surfaces at any desired angle in teeth within a subject's mouth and more particularly to such apparatus as is intraorally stabilized utilizing the physiological habit of the muscles of mastication.

In certain of the branches of dentistry such as those known as Operative, Crown and Bridge, Removable Partial Denture Prosthesis, and Periodontia it is considered to be highly desirable to have a dental instrument that could be employed by a dentist to guide his bur carrying drilling handpiece in preparing dental axial surfaces so that they are parallel to one another, in placing multiple parallel pin holes in natural teeth at any desired angle of insertion and in surveying partially prepared surfaces and pin holes to assure that surfaces are void of undesired undercuts and are in fact parallel.

Additionally, it is highly desirable and quite important that the instrument allow the bur carrying handpiece to be accessible to all dental surfaces upon which work of this nature is to be done, and be adjustable to allow the practitioner to take an extra-oral approach to these problems while relying on intra-oral stabilization.

Devices which have been previously proposed for enabling parallel drilling work to be done on a tooth or several teeth within a subject's mouth have either lacked versatility in being confined to usage in drilling only vertically or only horizontally or have been time consuming and cumbersome inasmuch as they were extra-orally stabilized, required the help of one or more assistants beside the patient and the dentist in order to properly orient the device in the mouth or could not be removed during pauses in the operation to let the patient rest with any degree of assurance that the device could be accurately replaced within the mouth in the preremoval position.

Using an instrument stabilized extra-orally as on the operating area wall or dental unit raises the problem of unacceptably disrupting the angle of insertion path if the patient moves such as by rinsing his mouth, slouching in the dental chair, crossing his legs or the like.

Accordingly, it is an object of the present invention to provide a dental paralleling instrument including improved means for the intra-oral stabilization thereof which is readily positioned within a patient's mouth with facility regardless of whether the mounting area is edentulous, partially edentulous or dentulous and which can be quickly removed and replaced in the proper position without requiring sophisticated manipulation.

It is a further object of the present invention to provide apparatus of the character described which can be utilized to position a bur carrying dental handpiece for access to any dental surfaces in the mouth without requiring the interchanging of any major components of the apparatus.

A further object of the invention is to provide apparatus of the type described which is additionally useful as an intra-oral surveyor and for other work of a diagnostic character.

More particularly, an object of the invention is to provide a novel intra-orally stabilized parallelizing drilling guide useful in both vertically planing dental surfaces as well as in preparing parallel pin holes in both maxillary and mandibular teeth at any chosen angle.

Another object of the invention is the provision in apparatus of the type described, of stabilizer extensions consisting of perforated trays which receive softened hardenable thermoplastic material and stabilize the bite block of the apparatus in edentulous or partially edentulous areas of the patient's mouth.

Yet another object of the present invention is the provision of apparatus for the preparation of both maxillary and mandibular anterior and posterior teeth for metallic or non-metallic intercoronal or extracoronal restorations while allowing for the conservation of tooth structure thereby making such restorations less sensitive by lessening the possibility of encroaching upon the integrity of the pulpal tissues.

More general objects of the invention are to facilitate the accomplishment of better quality work by the dental practitioner in a shorter amount of time with the enhancing of frictional retention of restorations because of the more precise parallelism of planed surfaces achievable with the apparatus of the present invention and to facilitate the performing of a wider range of dental operations than heretofore possible.

These and further objects of the present invention are elucidated upon in the following detailed explanation of the structure and functioning of a preferred embodiment of the apparatus of the present invention, reference being made to the attached drawings wherein an example of the apparatus is shown which demonstrates the principles of the invention.

In the drawings:

FIGURE 6 is a top plan view of the tool holding and guiding portion of the apparatus arranged to hold a drill for drilling vertically;

FIGURE 7 is a side elevation view of the tool holding and guiding means adjusted to hold a drill for drilling parallel to a tilted plane.

FIGURE 8 is a top plan view of the tool holding and guiding means arranged to hold a drill for drilling horizontally;

FIGURE 9 is a diagrammatic top plan view of the parallelizing arm showing a typical position to which it can be moved during drilling.

FIGURE 11 is a schematic plan view of teeth operated upon utilizing apparatus according to the invention showing the teeth planed vertically and horizontally and having pin receiving sockets formed therein.

Figure 1:
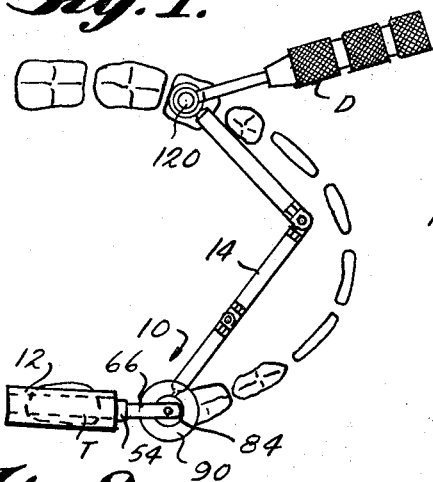
FIGURE 1 is a top plan view of apparatus according to the principles of the invention shown mounted in a mouth with the upper jaw removed for clarity, and with a dental handpiece bur received in the bur channeling bracket.

Now with more specific reference to the drawings, an intraorally stabilized drill parallelizing holder is generally indicated by the numeral 10 in FIGURE 1. As shown the holder 10 comprises a stabilizing bite block 12 and universally mounted parallelizing arm portion 14. An annular sleeve 120 carried at the free end of the arm 14 is arranged to receive the bur of any conventional dental handpiece D of the belt driven variety. As illustrated, the bite block 12 is received between the maxillary and mandibular jaws preferably in the posterior areas thereof between the dentulous arches, although the device can be easily modified according to the invention for mounting on partially edentulous arches utilizing the stabilizer extension 18 shown in FIGURES 2, 3 and 4.

The bite block 12 preferably includes an upper portion 20 having an upwardly facing channel 22 defined thereon by two transversely spaced inwardly facing inverted L-sectioned members 24 and a lower portion 26 carrying a downwardly facing, longitudinally extending channel 28 thereon defined by L-sectioned members 30 similarly positioned to members 24.

Figure 2:
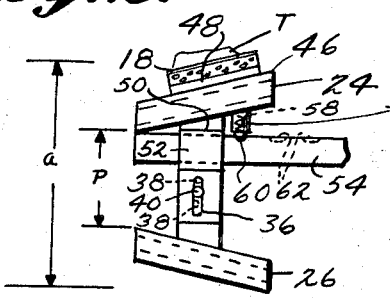
FIGURE 2 is a side elevation view of the mounting bracket of the bite block portion of the apparatus having a stabilizer extension received in the upper stabilizer channel thereof for mounting the device on an edentulous maxillary ridge.
Figure 3:
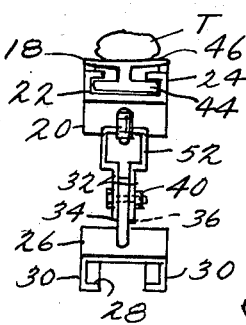
FIGURE 3 is a front elevation view of the bite block shown in FIGURE 2.
Figure 4:
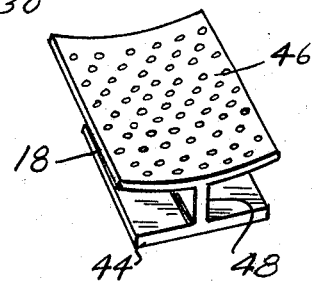
FIGURE 4 is a perspective view of the stabilizer extension shown in FIGURES 2 and 3.

As depicted the channels 22, 28 extend longitudinally in the same plane but are angularly directed with respect to one another so that, typically, the posterior vertical spacing $p$ of the channels is one inch and the anterior vertical spacing $a$ thereof is one and one-half inches. The upper and lower bite block portions are preferably vertically adjustable, for instance by ± one-fourth inch. One preferred arrangement for adjustability is shown in FIGURES 2 and 3 wherein the upper bite block member includes two spaced, downwardly directed legs 32 arranged to straddle a single upwardly directed leg 34 on the lower bite block member. The lower member leg 34 has a transverse hole 38 therethrough aligned with vertically extending transverse slots 36 formed through the legs 32 of the upper bite block member. Suitable fastening means such as a set screw 40 is received in the slots 36 and hole 38 to maintain the selected vertical relationship between the bite block portions 20, 26.

The bite block channels 22, 28 are each configured to receive a quantity of doughy-consistency, quick setting dental impression material T such as those composed of polymeric synthetic thermoplastic resins.

When the device is to be mounted on edentulous or partially edentulous surfaces, a stabilizer extension 18 can be slidably positioned in the channel facing the at least partially edentulous arch as shown in FIGURES 2 and 3.

The extension 18 is preferably about .4 inch in height, in order to compensate for the lack of tooth height at the mounting point and comprises a generally horizontally extending longitudinally elongated mounting plate 44 adapted to be slidably received in a channel 22 or 28, an outwardly concave, longitudinally elongated, perforated tray 46 for receiving a quantity of thermoplastic material T, and a vertical strut 48 connecting the tray 46 to the plate 44.

Preferably the channels 22, 28 converge slightly from their anterior to posterior and each plate 44 is configured likewise so that a frictional sliding fit for the tray plate 44 is provided by the channel 22 or 28.

The upper bite block member legs 32 are shown suddenly diverging at a point 50 intermediate their ends, extending a short distance parallel to one another then converging to their former spacing thereby defining a generally square channel 52 for receiving a square arm 54 on the parallelizing arm portion 14 of the device.

Forward of the arms 32, a short generally cylindrical tube 56 is mounted on the under surface of the channel 22 so as to have the lower end thereof open substantially even with the divergence 50.

A coil spring 58 is received within the tube 56 and a metal ball 60 or the like positioned subjacent the spring 58 to provide ball detent means for the square arm 54 for purposes clarified hereinafter.

As mentioned above the parallelizing arm portion 14 of the apparatus includes a longitudinally elongated non-circular sectioned arm 54 preferably having a square cross-section to be received within the channel 52. Semi-spherical indentations 62 spaced longitudinally along the upper surface 64 of the arm 54 are arranged to receive the ball 60 to provide a longitudinal adjustment of the position of the square arm 54 with respect to the device stabilizing bite block 12.

The forward end of the square arm 54 integrally carries a generally semicircular yoke 66 comprising an upwardly and forwardly curving upper member 68 and a downwardly and forwardly curving lower member 70. The forward ends 72 of the members 68, 70 preferably terminate in vertical alignment and have vertical openings 74, 76 formed therethrough adjacent its forward end 72.

Figure 5:
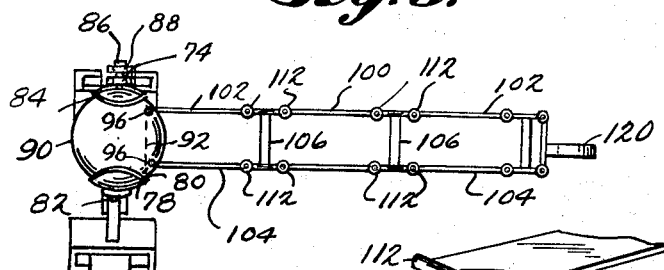
FIGURE 5 is a front elevational view of the assembled apparatus of FIGURE 1.

A first pressure pad in the form of a cup-like member 78 having a sphere conforming anti-frictionally lined inner surface 80 and a mounting pin 82 projecting radially from the center of the outer surface thereof for being axially slidably received in the yoke opening 76 is shown mounted on the yoke 66, especially in FIGURES 5 and 7.

A second pressure pad 84 configured and lined similarly to the member 78 with rubber or the like has a threaded mounting pin 86 projecting radially from the center of the exterior thereof and received in the yoke opening 74 which is threaded to receive the pin 86. A suitable non-circular head 88 such as a hexagon head is formed on the threaded pin 86 so that the second pressure pad 84 can be moved toward and away from the first pressure pad 78 by turning the threaded pin 86, for instance with a suitable wrench.

A ball 90 composed of stainless steel or the like is received between the cup-like pressure pads 78, 84 thereby forming a ball and socket, universal joint wherein the ball 90 is freely swivelable within the socket so long as the movable pressure pad 78 is not moved downwardly sufficiently that the rubber or like material on the inner surfaces of the pressure pads is forced into non-skid contact with the ball 90. The angular extent of the pads 78, 84 on the ball 90 should be sufficient to provide immobilization of the ball 90 upon the application of a reasonable amount of torque on the pin head 88, yet small enough to allow the hereinafter described drilling tool holding and guiding portion of the apparatus attached to the ball sufficient latitude of possible movement as to make all dental surfaces accessible to the drilling tool.

As best shown in FIGURE 9, the ball 90 has a relatively deep groove or notch 92 cut therein. Two vertically spaced, generally parallel narrow bore openings 94 are drilled through the ball generally perpendicularly to the extent of the notch 92 so as to intersect the notch sidewalls intermediate their depth. A stainless steel pin 96 or the like is frictionally received in each opening 94 and each receives suitable pivot means 98 thereon in the form of generally horizontal ears having vertical openings therethrough for providing a vertically oriented pivot line through the means 98 as shown in FIGURES 6 and 7.

A parallelizing arm arrangement 100 is pivotally pinned to the means 98 on the ball 90 for swinging movement transversely of the notch 92 as well as longitudinally thereof as more fully described below.

The arm arrangement 100 preferably comprises a series of four longitudinally aligned co-extensive upper members 102 and lower members 104; "upper" and "lower" being used to define the positioning of the members as shown in FIGURES 6 and 7. The junction between each vertically aligned pair of arm members 102, 104 is provided by a vertical axis pivot comprising a hollow tube 106 extending vertically between the members 102, 104, pivot pins 108 received in the tubes 106 and through vertically aligned openings 110 formed through adjacent, slightly overlapping ends of adjacent arm members 102 and through openings 110 in similarly positioned arm members 104. These vertical axis pivotal joints are completed by suitable spring means (not shown) positioned within the tubes 106 and arranged to bias the arm members to the longitudinally aligned position shown in FIGURE 6.

As illustrated in FIGURE 9, however, the arm member pairs 102, 104 can be pivoted with respect to one another about the vertically directed axes for moving the dental drilling arm to the desired position as will become apparent.

Intermediate each vertically directed pivot axis, each arm member is provided with a horizontally directed pivot axis 112 so that each arm member pair has two vertically aligned horizontal pivot axes 112 provided for instance by interdigitated ears 114 on the portions of each arm member adjacent each horizontal pivot axis 112 and a horizontal pivot pin 116 received within openings through the ears 114 to retain the arm member portions together. Each horizontal pivot axis 112 is preferably provided with suitable resilient means, such as coil springs, not shown, for returning the arm portions to the longitudinally aligned position shown in FIGURE 7. Alternatively, the pivot pins can be interference fit so that the arms will remain in any position to which they are moved until they are again moved by the practitioner.

Figure 10:
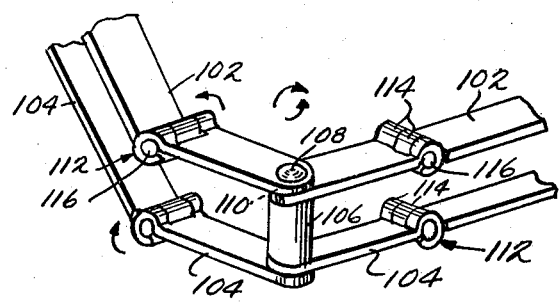
FIGURE 10 is a fragmentary perspective view of the parallelizing arm showing a typical position to which it can be moved during drilling.

The parallelizing arm is movable in a vertical plane by the practitioner as shown in FIGURE 10 to reach otherwise inaccessible portions of the patient's dental surfaces, being returned to the FIGURE 7 rest position by the spring means received within the horizontal pivots 112.

A novel dental bur carrying handpiece receiver bracket 120 is carried on the outer surface 122 of the member 118 and consists of a first outer tubular member 124, an inner tubular member 126 coextensive with and radially inwardly spaced from the member 124 and rollable bearing means 128 received between the inner and outer tubular members 124, 126.

Figure 12:
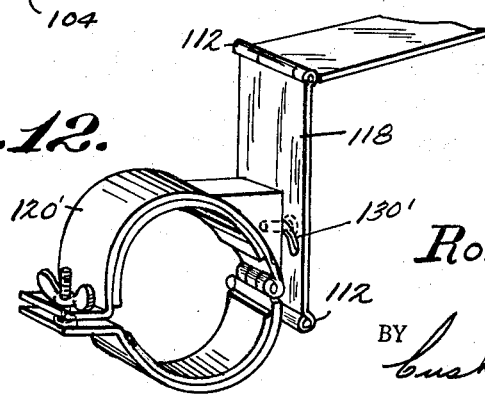
FIGURE 12 is a fragmentary perspective view showing a modified sleeve arrangement for receiving the shank of an air turbine drill handpiece.

The arrangement 120 is preferably mounted on the outer surface of the member 118 so that the throughbore 130 of the inner tubular member 126 is vertically directed as shown in FIGURE 1, but it may conveniently be positioned for angular adjustment to increase the versatility of the device of the invention. Additionally the arrangement can be modified as shown in FIGURE 12 wherein the bracket 120' is angularly adjustable at 130' to compensate for the canted orientation of the bur of an air turbine drill with respect to its handpiece.

OPERATION

To utilize the device according to the invention, the dental practitioner adjusts the bite block 12 to the desired vertical height, places a mound of softened thermoplastic material in the channels 22, 28 (or on the concave upper surfaces of stabilizer extensions 18 if the maxillary or mandibular mounting is edentulous), and inserts the bite block between the patient's jaws. The patient is then counseled to bite downwardly, slightly and hold this position for a few seconds until the thermoplastic material T has hardened.

The dentist next slides the square arm 54 in the square channel 52 until the ball 60 seats in the desired detent 62. If the work to be done consists of vertically planing axial dental surfaces, the ball 90 will be positioned as shown in FIGURES 1, 6 and 7. If the intent is to drill horizontal pin holes the ball will be rotated to the position shown in FIGURE 8 prior to being clamped in position by turning the hexagon head 88 of the threaded pin 86.

Utilizing the device 10 according to the present invention it is not only possible to perform dental work parallelized along vertical or horizontal axis but at any intermediate angle, by simply choosing the angle and securing the ball 90 at that angle as discussed above.

After the working angle has been chosen and the ball 90 immobilized at this angle, the dentist merely frictionally inserts the forward end of his bur carrying handpiece into the bracket through bore 130 and begins drilling as shown in FIGURE 1.

Because of the vertical and horizontal pivotability of the arms 102, 104 the dentist can reach points not only to the left and right of the rest position of the parallelizing arms as shown in FIGURE 6 but also above and below their rest position shown in FIGURE 7, but in each case the axis of the dental bur will be parallel to the longitudinal direction of the notch in the ball 90.

It is important to note that, because a permanent index is formed by the setting of the thermoplastic compound T, the entire device 10 can be quickly removed from the patient's mouth with facility to allow him to rest, rinse his mouth, etc. and can be reinserted to take the exact position it formerly had without loss of the parallelism provided by the device.

Noting FIGURE 11, showing teeth operated upon using the device 10 of the invention, it is possible to operate not only on axial dental surfaces A but to utilize an extra-oral approach to the axial facial surfaces B, plane horizontal surfaces C and drill parallel pin holes D at any orientation.

Because the device 10 is intra-orally stabilized, and utilizes the normal physiological habit of the muscles of mastication requiring their mild exertion it is very stable and quite accurately provides parallelism, regardless of the head movement of the patient or of the number of times it is necessary to remove the device 10 from the patient's mouth.

Due to the novel ball and socket mounting of the parallelizing arm mechanism, vertical upward and downward adjustment of the arm can be provided, preferably to the extent of at least ±45°, thus increasing the utility of the instrument according to the invention.

The bearing including bracket 120 is particularly advantageously used in receiving the shank of the handpiece of a high speed drill inasmuch as the arrangement receives the shank firmly, preventing wobbling while negating any effect of the bur's freezing within the opening 130 due to frictional heat induced expansion.

It should now be clear that the construction and principles of an improved precision intra-orally stabilized parallelizing dental drilling guide have been set forth which efficiently accomplishes all of the objects noted at the outset of this specification.

Additionally it should be recognized that the apparatus described herein is extremely versatile in facilitating the performance of many dental operations not specifically discussed. For instance, the apparatus is useful in creating parallel walls in dental arches to provide for a path of insertion and retention of removable partial denture prosthesis. Using this procedure, less hardware is necessary in the construction of the removable appliance, the appliance will have more stability and provide a splinting effect for the remaining dentition. In some instances the need for preparing teeth and constructing expensive survey crowns may be dispensed with.

Inasmuch as the preferred construction shown is susceptible of many modifications without departing from the principles of the invention set forth herein, the extent of the invention should be limited, not to the embodiment shown, but only by the spirit and scope of the following claims.

I claim:

1. An intra-orally stabilized dental drilling guide comprising a stabilizer bite block adapted to be received between maxillary and mandibular dental arches; means mounting a ball socket on said bite block; a ball received by said ball socket; means on said ball socket means for selectively immobilizing said ball at any desired angular position thereof; a relatively deep groove in said ball, said groove having opposed sidewalls; means defining two vertically spaced, generally parallel narrow bore openings through the ball generally perpendicularly to the extent of said groove, said two openings intersecting said groove sidewalls intermediate the depth of said sidewalls; a first pin frictionally received in one of the openings, a second pin frictionally received in the other of the openings; parallelizing arm means comprising a plurality of end-to-end connected upper and lower coextending arm pairs; first pivot means provided adjacent at least one end of each arm pair for pivoting said arm pairs about axes substantially parallel to the plane containing each arm pair; and second pivot means on each arm pair intermediate the ends of each pair for pivoting said arm pairs about axes perpendicular to respective planes containing each arm pair; an upper end one of said arm pair arms being pivotally secured at an end thereof to said first pin within said groove for pivoting about said first pin; the lower arm paired with said upper end one arm being pivotally secured at a respective end thereof to said second pin within said groove for pivoting about said second pin, said parallelizing arm means being thereby mounted on said ball and extending outwardly therefrom; and means positioned on the parallelizing arm means adjacent the outer extent thereof from said ball for receiving a bur carrying dental handpiece.

2. Apparatus as set forth in claim 1 wherein the bite block comprises an upper member carrying an upwardly opening downwardly and backwardly oriented channel and a lower member carrying a downwardly opening upwardly and backwardly oriented channel, said channels being arranged to receive a dough-like settable plastic stabilizing compound for providing an index for said apparatus.

3. Apparatus as set forth in claim 2 wherein said channels decrease rearwardly in cross-section and are each adapted to slidably receive a stabilizer extension for stabilization of the apparatus on at least partially edentulous surfaces.

4. Apparatus as set forth in claim 3 wherein said stabilizer extension comprises a generally horizontally extending channel received mounting plate having a rearwardly decreasing width, an outwardly concave, elongated and perforated indexing compound receiving tray, and a strut securing said tray to said plate.

5. An intra-orally stabilized dental drilling guide comprising a stabilizer bite block adapted to be received between maxillary and mandibular dental arches; means mounting a ball socket on said bite block; a ball received by said ball socket; means on said ball socket means for selectively immobilizing said ball at any desired angular position thereof; parallelizing arm means mounted on said ball and extending outwardly therefrom; and means positioned on the parallelizing arm adjacent the outer extent thereof for receiving a bur carrying dental handpiece; the ball socket mounting means comprising a non-circular channel directed longitudinally of the bite block intermediate the upper and lower extent of the bite block and a non-circular arm slidably received in said channel, said socket being secured to the forward end of said non-circular arm; the ball socket comprises an elongated upwardly and forwardly extending upper yoke portion, an elongated downwardly and forwardly extending lower yoke portion, a pressure pad received at the forward extent of the two yoke portions, and means for moving one of the pressure pads toward the other pressure pad to immobilize the ball received in said socket.

6. Apparatus as set forth in claim 5 wherein the parallelizing arm means comprises a plurality of upper and lower coextending arm pairs, and first pivot means provided adjacent at least one end of each arm pair for pivoting said arm pairs about axes substantially parallel to the plane containing each arm pair.

7. Apparatus as set forth in claim 6 additionally comprising second pivot means on each arm pair intermediate the ends of each pair, said second pivot means providing pivotability of said arms substantially perpendicularly to said first pivot means.

8. Apparatus as set forth in claim 5 wherein the non-circular arm and channel have ball detent means provided therebetween whereby the orientation of the ball with respect to the bite block is longitudinally adjustable.

9. Apparatus as set forth in claim 5 wherein the pressure pads have anti-friction material bearing sphere-conforming surfaces presented toward said ball.

10. An intra-orally stabilized dental drilling guide comprising a stabilizer bite block adapted to be received between maxillary and mandibular dental arches; means mounting a ball socket on said bite block; a ball received by said ball socket; means on said ball socket means for selectively immobilizing said ball at any desired angular position thereof; parallelizing arm means mounted on said ball and extending outwardly therefrom; and means positioned on the parallelizing arm adjacent the outer extent thereof for receiving a bur carrying dental handpiece; said bite block comprising an upper member carrying an upwardly opening downwardly and backwardly oriented channel, said channels being arranged to receive a dough-like settable plastic stabilizing compound for providing an index for said apparatus; said upper and lower bite block members being vertically adjustable to accommodate varied mouth sizes.

11. An intra-orally stabilized dental drilling guide comprising a stabilizer bite block adapted to be received between maxillary and mandibular dental arches; means mounting a ball socket on said bite block; a ball received by said ball socket; means on said ball socket means for selectively immobilizing said ball at any desired angular position thereof; parallelizing arm means mounted on said ball and extending outwardly therefrom; and means positioned on the parallelizing arm adjacent the outer extent thereof for receiving a bur carrying dental handpiece; the parallelizing arm means comprises a plurality of upper and lower coextending arm pairs, and first pivot means provided adjacent at least one end of each arm pair for pivoting said arm pairs about axes substantially parallel to the plane containing each arm pair; second pivot means on each arm pair intermediate the ends of each pair, said second pivot means providing pivotability of said arms substantially perpendicularly to said first pivot means; said first and second pivot means include resilient means for bringing all of said arm pairs to a longitudinally aligned rest position.

12. Apparatus as set forth in claim 7 including a dental handpiece receiver; means securing said dental handpiece receiver to the outermost ends of the outermost upper and lower arm pair; the dental handpiece mounted on said receiver and comprising an outer tube, a substantially coextensive inner tube spaced radially inwardly from said outer tube, and rollable bearing means received between said inner and outer tubes.

References Cited

UNITED STATES PATENTS

| | | | |
|---|---|---|---|
| 2,917,829 | 12/1959 | Page | 32—27 |
| 3,063,149 | 11/1962 | Sugg | 32—67 |
| 3,083,462 | 4/1963 | Jermyn | 32—67 |
| 3,152,401 | 10/1964 | Cowan et al. | 32—67 |

RICHARD A. GAUDET, *Primary Examiner.*

R. L. FRINKS, *Assistant Examiner.*